US007451036B2

(12) United States Patent
Fuwa et al.

(10) Patent No.: US 7,451,036 B2
(45) Date of Patent: Nov. 11, 2008

(54) CONTROL APPARATUS AND CONTROL METHOD FOR INTERNAL COMBUSTION ENGINE

(75) Inventors: Naohide Fuwa, Toyota (JP); Hisayo Dohta, Chiryu (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/527,689

(22) Filed: Sep. 27, 2006

(65) Prior Publication Data

US 2007/0021900 A1 Jan. 25, 2007

Related U.S. Application Data

(62) Division of application No. 10/854,712, filed on May 27, 2004, now Pat. No. 7,162,356.

(30) Foreign Application Priority Data

May 27, 2003 (JP) ............................ 2003-149305

(51) Int. Cl.
*B60T 7/12* (2006.01)
*G05D 1/00* (2006.01)

(52) U.S. Cl. ...................................... 701/103; 701/104

(58) Field of Classification Search ................. 701/101, 701/102, 103, 104, 108, 110, 114, 115; 123/90.15
See application file for complete search history.

(56) References Cited

U.S. PATENT DOCUMENTS 5,636,634 A 6/1997 Kordis et al.
5,832,400 A * 11/1998 Takahashi et al. ............. 701/53
5,950,419 A * 9/1999 Nishimura et al. ............ 60/274
6,109,225 A 8/2000 Ogita et al.
6,266,605 B1 * 7/2001 Yasui et al. ................. 701/109
6,321,156 B1 11/2001 Kraemer
6,425,357 B2 7/2002 Shimizu et al.
6,522,024 B1 * 2/2003 Takaoka et al. ........... 290/40 C
6,626,144 B1 * 9/2003 Kanamaru .................. 123/399
6,691,022 B2 * 2/2004 Takemura et al. ........... 701/109
6,915,777 B2 * 7/2005 Fukushima et al. ......... 123/335

(Continued)

FOREIGN PATENT DOCUMENTS

DE 198 59 018 A1 6/2000

(Continued)

*Primary Examiner*—John T Kwon
(74) *Attorney, Agent, or Firm*—Oliff & Berridge, PLC

(57) ABSTRACT

A control apparatus for an internal combustion engine provided with a fuel supply mechanism capable of adjusting a fuel supply amount includes a flow rate sensor that detects an intake air flow rate that represents a flow rate of air admitted into a combustion chamber of the internal combustion engine, a pressure sensor that detects a pressure of the air admitted into the combustion chamber of the internal combustion engine, a characteristic change estimation unit that estimates a characteristic change of the internal combustion engine in accordance with the intake air flow rate detected by the flow rate sensor and the intake air pressure detected by the pressure sensor, and a fuel supply mechanism control unit that controls the fuel supply mechanism. The fuel supply mechanism control unit controls the fuel supply mechanism such that the characteristic change in the internal combustion engine is compensated in accordance with an estimation performed by the characteristic change estimation unit.

15 Claims, 13 Drawing Sheets

U.S. PATENT DOCUMENTS

2002/0107630 A1 8/2002 Yagi

FOREIGN PATENT DOCUMENTS

| | | | |
|---|---|---|---|
| DE | 199 06 707 A1 | | 8/2000 |
| EP | 1 262 639 A2 | | 12/2002 |
| JP | A-63-005128 | | 1/1988 |
| JP | A-2003-049672 | | 2/2003 |

* cited by examiner

FIG. 9

CORRECTION AMOUNT Ea' IN SECOND EMBODIMENT

| Ne(PRM) \ OPERATION ANGLE (deg) | 0～100 | 101～110 | 111～120 | 121～130 | ··· | 260 |
|---|---|---|---|---|---|---|
| 0～800 | | | | | | |
| 801～1600 | | | 2.3 | | | |
| 1601～2400 | | 2.5 | | 2.6 | | |
| 2401～3200 | | | | | | |
| 3201～4000 | | | | | | |
| 4001～4800 | | | | | | |
| 4801～5600 | | | | | | |

CORRECTION AMOUNT Ea″ IN THIRD EMBODIMENT

| TIME AREA (ms × mm) | 0~ 2.0 | 2.1~ 4.0 | 4.1~ 6.0 | 6.1~ 8.0 | ... | 34.1 ~35.0 |
|---|---|---|---|---|---|---|
| CORRECTION VALUE | | −2.4 | | −2.3 | | |

UNIT:ms・mm

CONTROL APPARATUS AND CONTROL METHOD FOR INTERNAL COMBUSTION ENGINE

INCORPORATED BY REFERENCE

This is a Division of Application No. 10/854,712 filed May 27, 2004. The disclosure of Japanese Patent Application No. 2003-149305 filed on May 27, 2003 including the specification, drawings and abstract is incorporated herein by reference in their entirety.

BACKGROUND OF THE INVENTION

1. Field of Invention

The invention relates to a control technology for an internal combustion engine mounted in a vehicle.

2. Description of Related Art

An air fuel ratio control (fuel injection control) technology with higher accuracy becomes indispensable for coping with emission regulations that has been becoming increasingly severe year by year. In order to realize the air fuel ratio control with higher accuracy, the accuracy of calculating an amount of air charged in the cylinder, that is, intake air amount within a combustion chamber of an internal combustion engine has to be further improved. Such calculation has been disclosed in the United States Patent Application Publication No. 2002/0107630 A1 in which the amount of air within the cylinder is calculated using an intake system model, for example. The intake system model is intended to clarify the behavior of the intake air that flows from the throttle valve to the intake port of the combustion chamber.

The behavior of the intake air that flows through the intake passage will vary with aging, for example, sediments deposited on the intake passage. Accordingly, the actual behavior of the intake air may not accord with the behavior in the intake system model, resulting in an error in the estimated amount of air within the cylinder. An opening/closing characteristic of a valve provided in the intake port of the combustion chamber will also vary with aging, for example, mechanical wear or deformation of a valve system and the like. This may also cause the error in the estimated amount of air in the cylinder. Such error is caused not only by the aging as aforementioned but also by the piece-to-piece variation among internal combustion engines at a stage immediately after producing thereof.

SUMMARY OF THE INVENTION

It is an object of the invention to provide a technology for preventing deterioration in performance of the air fuel ratio control owing to aging or piece-to-piece variation among internal combustion engines.

According to a first aspect of the invention, a control apparatus that controls an internal combustion engine includes a fuel supply mechanism capable of adjusting a fuel supply amount. The control apparatus is further provided with a characteristic change estimation unit that estimates a characteristic change in the internal combustion engine in accordance with a predetermined condition, wherein the fuel supply mechanism control unit controls the fuel supply mechanism such that the characteristic change in the internal combustion engine is compensated in accordance with an estimation performed by the characteristic change estimation unit.

According to a first aspect of the invention, the characteristic change in the internal combustion engine is estimated based on the predetermined condition. The characteristic change is compensated by correcting quantity of the fuel to be supplied in accordance with the estimated value. This makes it possible to prevent deterioration in performance of the air fuel ratio control owing to aging or piece-to-piece variation among internal combustion engines.

In the first aspect of the invention, the control apparatus may further comprise one or both of a flow rate sensor that detects an intake air flow rate that represents a flow rate of air admitted into a combustion chamber of the internal combustion engine and a pressure sensor that detects an intake air pressure that represents a pressure of the air admitted into the combustion chamber of the internal combustion engine. The characteristic change estimation unit may estimate the characteristic change in the internal combustion engine in accordance with one or both of the intake air flow rate detected by the flow rate sensor and the intake air pressure detected by the pressure sensor.

In the first aspect of the invention, the internal combustion engine includes a valve adjustment mechanism that is capable of adjusting at least one of a lift amount and an operation angle of a valve, and the control apparatus may further include a valve adjustment mechanism control unit that controls the valve adjustment mechanism.

The aforementioned structure gives an advantageous effect especially to the internal combustion engine provided with a valve lift adjustment mechanism because the characteristics of this type of the internal combustion engine tend to considerably vary with aging. More specifically, the aforementioned internal combustion engine is supposed to be operated with a relatively smaller valve lift amount. In the course of such operation, the intake air amount within the cylinder may be greatly affected by sediments deposited around the valve or the intake port leading to the combustion chamber.

According to a second aspect of the invention, a control apparatus that controls an internal combustion engine includes a valve adjustment mechanism that is capable of adjusting at least one of a lift amount and an operation angle of a valve. The control apparatus is provided with a characteristic change estimation unit that estimates a characteristic change in the internal combustion engine in accordance with a predetermined condition, and a valve adjustment mechanism control unit that controls the valve adjustment mechanism. The valve adjustment mechanism control unit controls the valve adjustment mechanism such that the characteristic change in the internal combustion engine is compensated in accordance with an estimation performed by the characteristic change estimation unit.

In the second aspect of the invention, the characteristic change of the internal combustion engine is estimated based on the intake air flow rate and the intake air pressure. It may be compensated by correcting the valve lift amount in accordance with the estimated value. This makes it possible to prevent deterioration in performance of the air fuel ratio control owing to aging or piece-to-piece variation among internal combustion engines.

In the second aspect of the invention, the control apparatus may further comprise one or both of a flow rate sensor that detects an intake air flow rate that represents a flow rate of air admitted into a combustion chamber of the internal combustion engine and a pressure sensor that detects an intake air pressure that represents a pressure of the air admitted into the combustion chamber of the internal combustion engine. The characteristic change estimation unit may estimate the characteristic change in the internal combustion engine in accordance with one or both of the intake air flow rate detected by the flow rate sensor and the intake air pressure detected by the pressure sensor.

In the aforementioned control system, the characteristic change estimation unit may estimate a mechanical characteristic change in the valve adjustment mechanism including a change in an amount of at least one of the lift amount and the operation angle of the valve. In the aforementioned control apparatus, the characteristic change estimation unit may estimate a change in an intake air characteristic of the internal combustion engine. The change in the intake air characteristic may be an aerodynamic characteristic change which includes a change in a pressure loss on a path where air is admitted into the combustion chamber of the internal combustion engine.

In the aforementioned control apparatus, the characteristic change estimation unit may be structured to perform an estimation when the internal combustion engine is in a predetermined normal operation state where a load and an engine speed of the internal combustion engine are held within a predetermined range for a predetermined time period.

In the aforementioned control apparatus, the behavior of the intake air may be estimated in a stable state, improving accuracy in estimating the characteristic change of the internal combustion engine.

In the aforementioned control system, the internal combustion engine is capable of executing a purging control under which the fuel vaporized within a fuel tank is released into the intake air or an EGR control under which exhaust gas is partially mixed with the intake air so as to be re-circulated. The characteristic change estimation unit may be structured to perform the estimation when the purging control or the EGR control is not executed.

Under the purging control or EGR control, the behavior of the intake air may fluctuate to deteriorate the estimation accuracy. If the estimation is performed in the time at which the purging control or the EGR control is not executed, deterioration in the estimation accuracy caused by the purging control or the EGR control may be avoided.

In the aforementioned control system, the valve adjustment mechanism control unit is capable of executing a calibration operation so as to confirm a reference position of the valve adjustment mechanism. The characteristic change estimation unit may be structured to perform the estimation after completion of the calibration operation.

The accuracy in the control of the valve adjustment mechanism cannot be ensured unless calibration is completed. Deterioration in accuracy of the control of the valve adjustment mechanism may be avoided by performing the estimation after completion of calibration.

In the aforementioned control system, the characteristic change estimation unit may be structured to perform the estimation in accordance with a combination of the engine speed of the internal combustion engine and an adjustment position of the valve adjustment mechanism. In the aforementioned control system, the characteristic change estimation unit may also be structured to perform the estimation at every valve opening time area obtained by integrating the lift amount of the valve with time. In the case where the internal combustion engine is not provided with the valve adjustment mechanism, the adjustment position thereof is used as a fixed value.

According to a third aspect of the invention, an internal combustion engine includes a fuel supply mechanism capable of adjusting a fuel supply amount. The internal combustion engine includes a control apparatus provided with a characteristic change estimation unit that estimates a characteristic change in the internal combustion engine in accordance with a predetermined condition, and a fuel supply mechanism control unit that controls the fuel supply mechanism, the fuel supply mechanism control unit controlling the fuel supply mechanism such that the characteristic change in the internal combustion engine is compensated in accordance with an estimation performed by the characteristic change estimation unit.

According to a fourth aspect of the invention, an internal combustion engine includes a valve adjustment mechanism capable of adjusting at least one of a lift amount and an operation angle of a valve. The internal combustion engine includes a control apparatus provided with, a characteristic change estimation unit that estimates a characteristic change in the internal combustion engine in accordance with a predetermined condition, and a valve adjustment mechanism control unit that controls the valve adjustment mechanism, the valve adjustment mechanism control unit controlling the valve adjustment mechanism such that the characteristic change in the internal combustion engine is compensated in accordance with an estimation performed by the characteristic change estimation unit.

According to a fifth aspect of the invention, a measurement apparatus that measures an amount of air charged in a cylinder as an amount of air admitted into a combustion chamber of an internal combustion engine. The measurement apparatus is provided with a characteristic change estimation unit that estimates a characteristic change in the internal combustion engine in accordance with a predetermined condition, and an in-cylinder air charging amount calculation unit capable of correcting an amount of air charged in the cylinder so as to compensate the characteristic change in the internal combustion engine in accordance with an estimation performed by the characteristic change estimation unit.

It is to be understood that the invention may be realized in the form of a method of controlling the internal combustion engine, an internal combustion engine provided with the aforementioned control apparatus, a measurement device and a method that measure the amount of air within the cylinder of the internal combustion engine, or any other form so long as it does not depart from spirit and scope of the invention.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein:

FIG. 9 is an explanatory view that shows each value of correction amounts Ea' calculated in the second embodiment;

DETAILED DESCRIPTION OF PREFERRED EMBODIMENTS

Preferred embodiments of the invention will be described in the following sections:

A. Structure;

B. Valve Train Control System According to a First Embodiment;

C. Valve Train Control System According to a Second Embodiment;

D. Valve Train Control System According to a Third Embodiment;

E. Valve Train Control System According to a Fourth Embodiment; and

F. Modified Embodiment.

A. Structure

Figure 1:
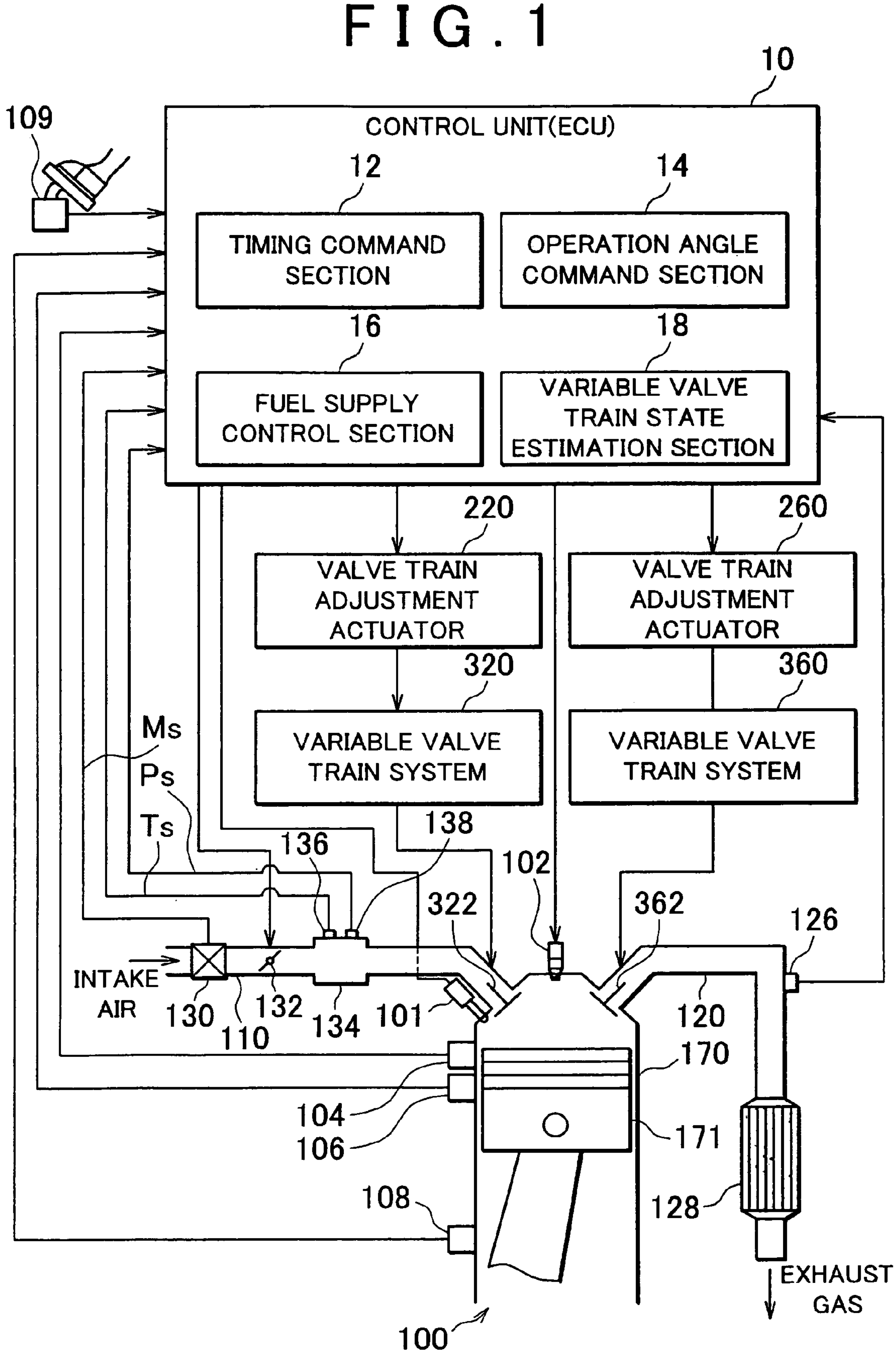
FIG. 1 is a schematic view that shows a structure of an internal combustion engine and a control unit thereof as an embodiment of the invention.

FIG. 1 is an explanatory view that shows a structure of an internal combustion engine and a control system thereof as a preferred embodiment of the invention. The control system is structured to control a gasoline engine 100 as an internal combustion engine mounted in a vehicle. The engine 100 is provided with an intake pipe 110 for supplying air (new air) into a combustion chamber, and an exhaust pipe 120 for discharging exhaust gas from the combustion chamber to the outside. The combustion chamber is provided with a fuel injection valve 101 for injecting the fuel into the combustion chamber, a spark plug 102 for igniting air/fuel mixture within the combustion chamber, an intake valve 322, and an exhaust valve 362.

The intake pipe 110 is provided with an air flow meter 130 (flow rate sensor) that detects an intake air flow rate, a throttle valve 132 that adjusts the intake air flow rate, and a surge tank 134 arranged in the order from upstream of the intake pipe 110. The surge tank 134 is provided with an intake air temperature sensor 136 and an intake air pressure sensor 138. An intake air passage of the surge tank 134 at the downstream side is split into a plurality of branch pipes each connected to the corresponding combustion chambers. In FIG. 1, however, only a single branch pipe is shown for simplifying the description. The exhaust pipe 120 is provided with an air/fuel ratio sensor 126 and a catalyst 128 that eliminates harmful component contained within the exhaust gas. The air flow meter 130 or the pressure sensor 138 may be placed on the position other than those described above. In this embodiment, the fuel is directly injected into the combustion chamber. However, the fuel may be injected into the intake pipe 110.

Intake/discharge operation of the engine 100 is selected in accordance with each opening/closing state of the intake valve 322 and the exhaust valve 362. The intake valve 322 and the exhaust valve 362 are connected to variable valve train systems 320, 360, respectively such that the respective valve-opening characteristics can be changed. Those variable valve train systems 320, 360 are capable of changing the operation angle and the opening/closing timing with respect to the crankshaft. The aforementioned variable valve train system may be employed as disclosed in the U.S. Pat. No. 6,425,357. Alternatively, it is possible to employ the variable valve train system that is capable of changing the operation angle and the phase using an electromagnetic valve.

The variable valve train systems 320, 360 are connected to valve train adjustment actuators 220, 260, respectively. Those valve train adjustment actuators 220, 260 are feedback controlled by a control unit 10 to be described in detail below.

The operation of the engine 100 is controlled by the control unit 10. The control unit 10 is formed as a micro-computer including CPU, RAM, and ROM therein. The control unit 10 receives signals from various sensors. Those sensors include not only the aforementioned sensors 136, 138, 126 but also a knock sensor 104, a water temperature sensor 106 that detects a water temperature in the engine, an engine speed sensor 108 that detects the engine speed, and an accelerator sensor 109.

The control unit 10 includes a timing command section 12 for setting an operation timing of the valves 322, 362 with respect to the crankshaft, and an operation angle command section 14 for setting the operation angle of the valves 322, 362. Those sections are capable of controlling the variable valve train systems 320, 360 based on the engine speed, load, and water temperature of the engine 100. The control unit 10 further includes a fuel supply control section 16 for controlling quantity of the fuel supplied to the combustion chamber by the fuel injection valve 101, and a variable valve train estimation section 15 for estimating the state change in each of the variable valve train systems 320, 360 owing to aging. The respective functions of those sections will be described later.

Figure 2:
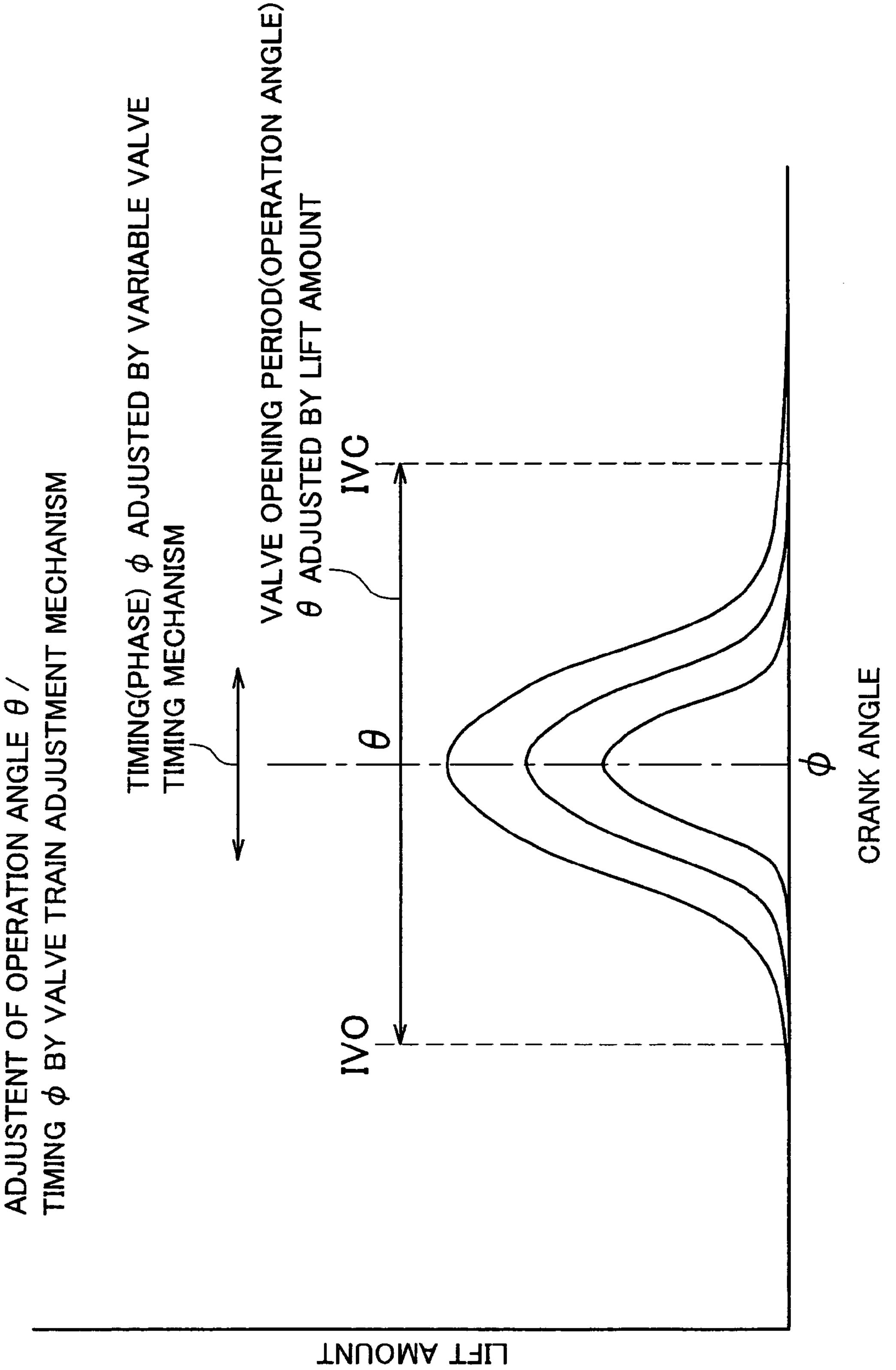
FIG. 2 is an explanatory view that relates to an adjusting operation of an opening/closing timing of an intake valve by a variable valve train system.

FIG. 2 is an explanatory view that shows how the open/close timing of the intake valve 322 is adjusted by the variable valve train system 320. The variable valve train system 320 in this embodiment is structured to change the operation angle $\theta$ and the lift amount at the same time. The open/close timing $\phi$, that is, the center of the valve-opening period with respect to the crankshaft is adjusted by the variable valve timing mechanism of the variable valve train system 320.

The variable valve train system 320 is capable of changing the operation angle of the intake valve 322 independent of changing of the operation timing thereof with respect to the crankshaft. Therefore, the operation angle of the intake valve 322 and the operation timing thereof with respect to the crankshaft can be set to appropriate values independently. The variable valve train system 360 for the exhaust valve 362 exhibits the same characteristics as those of the variable valve train system 320.

Figure 3:
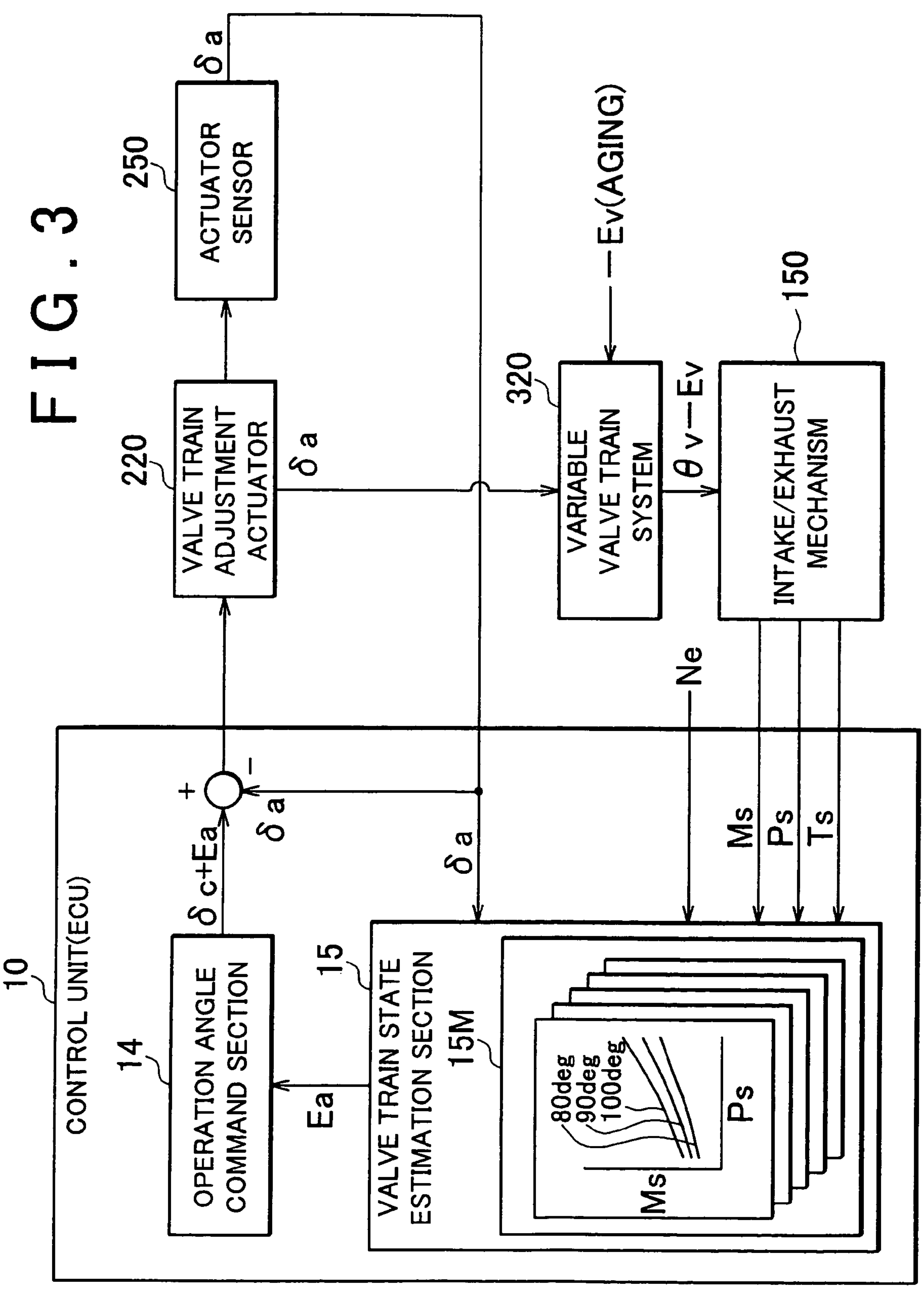
FIG. 3 is a block diagram of the variable valve train system in a first embodiment.

B. Valve Train Control System of the First Embodiment:

FIG. 3 is a block diagram of the valve train control system of the first embodiment. The valve train control system is structured to compensate the substantial reduction in the operation angle Ev (see FIG. 3) of the valve owing to aging of the variable valve system 320. This embodiment becomes effective especially when it is known that the main cause of change in the subject to be controlled as an elapse of time is the substantial reduction in the operation angle of the valve owing to aging of the variable valve system 320. The operation angle $\theta v$ is set as the nominal operation angle on the assumption that there is no change owing to aging.

Wear of the cam (not shown) of the valve or deformation of the locker arm (not shown) may cause substantial reduction in the operation angle of the valve resulting from aging of the variable valve system 320. Accordingly, the valve train state estimation section 15 is operable on the assumption that the substantial reduction in the operation angle of the valve is held constant irrespective of the operation state.

The valve train control system of the embodiment is realized by the valve train adjustment mechanism actuator 220 feedback controlled by the ECU 10. The feedback control to the valve train adjustment mechanism actuator 220 is realized by measuring a mechanical operation amount δa of the valve train adjustment mechanism actuator 220 which is feedbacked to the ECU 10. Then the valve train adjustment mechanism actuator 220 is controlled such that the mechanical operation amount δa becomes close to a target value (δc+Ea) output from the operation angle command section 14. The measurement error of the actuator sensor 250 is assumed to be negligible for the purpose of simplifying the description.

The target value (δc+Ea) is obtained by adding the nominal lift amount δc corresponding to the nominal operation angle θv to the correction value Ea (compensated lift amount) for compensating the substantial reduction amount Ev owing to aging of the variable valve system 320. The nominal lift amount δc is set in accordance with the engine speed Ne of the engine 100 in reference to the operation angle map (not shown) stored in the operation angle command section 14.

The correction amount Ea is derived from the intake pressure Ps input from the intake/exhaust mechanism 150, intake air flow rate Ms, intake air temperature Ts, mechanical operation amount δa input from the actuator sensor 250, and the engine speed Ne. The intake air pressure Ps as the pressure within the surge tank 132 (FIG. 1) is measured by the intake air pressure sensor 138. The intake air flow rate Ms as the flow rate of air (new air) within the intake pipe 110 is measured by the air flow meter 130. The intake air temperature Ts as the temperature of air within the surge tank 13 is measured by the intake air temperature sensor 136.

The correction amount Ea can be calculated using measured value and the valve train system state estimation map 15M. The map 15M includes a plurality of maps each prepared as a combination of the engine speed Ne and the intake air temperature Ts. Each of the maps represents the relationship among the intake air pressure Ps, the intake air flow rate Ms, and the operation angle θ, respectively.

The valve train state estimation section 15 calculates the correction amount Ea in the following manner:

(1) An appropriate map is selected among the group of maps in accordance with the engine speed Ne and the intake air temperature Ts;

(2) An aerodynamic estimated operation angle θea is calculated based on the intake air pressure Ps and the intake air flow rate Ms in reference to the map (described later); and (3) A mechanical estimated operation angle θeδ is derived from a mechanical operation amount δa input from the actuator sensor 250. The calculation is performed based on the predetermined relationship between the mechanical operation amount δa of the actuator 220 and the operation angle of the valve. In this case, the reduction in the operation angle of the valve owing to aging is not considered for the aforementioned relationship.

Figure 4A:
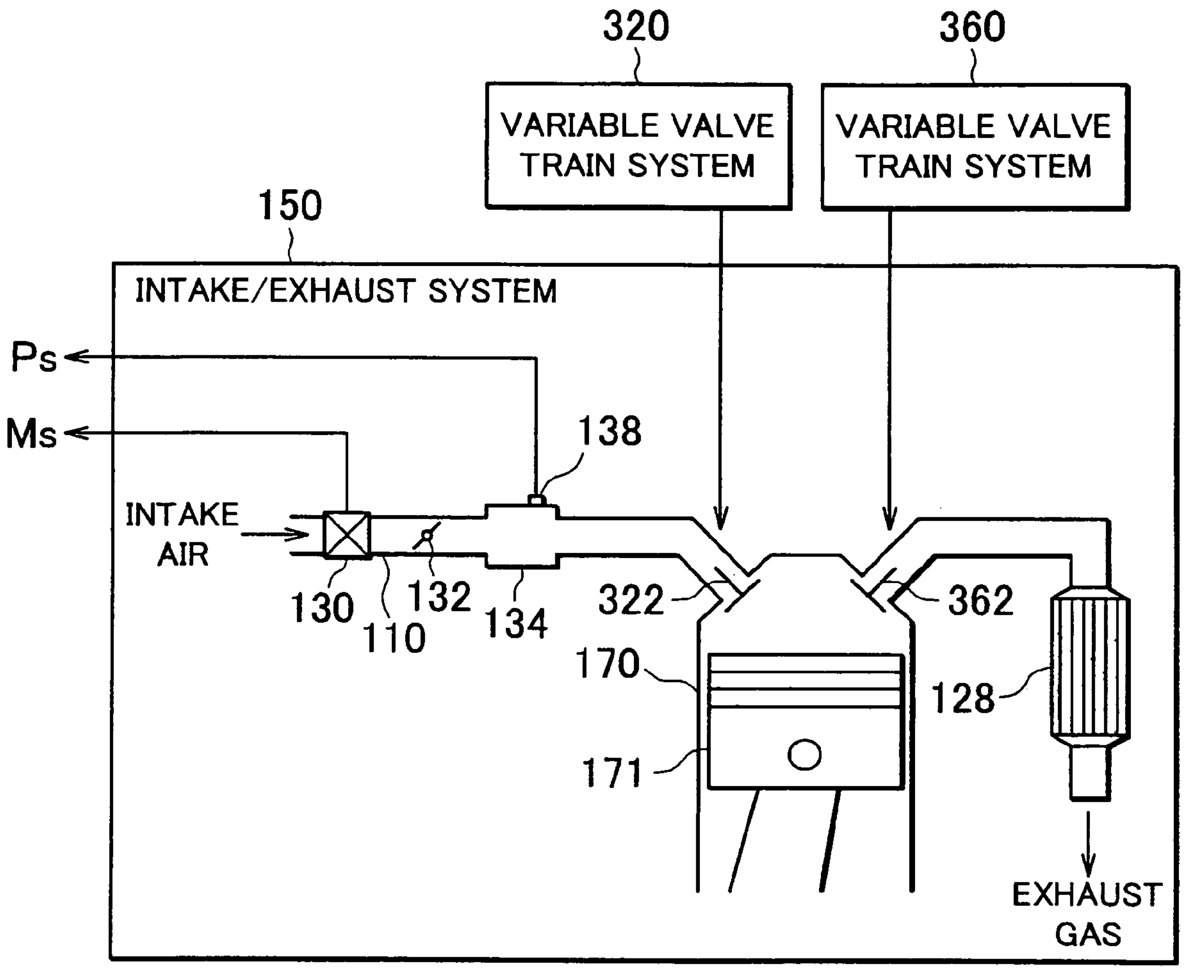
FIG. 4A and FIG. 4B are explanatory views each showing how an operation angle is aerodynamically estimated.
Figure 4B:
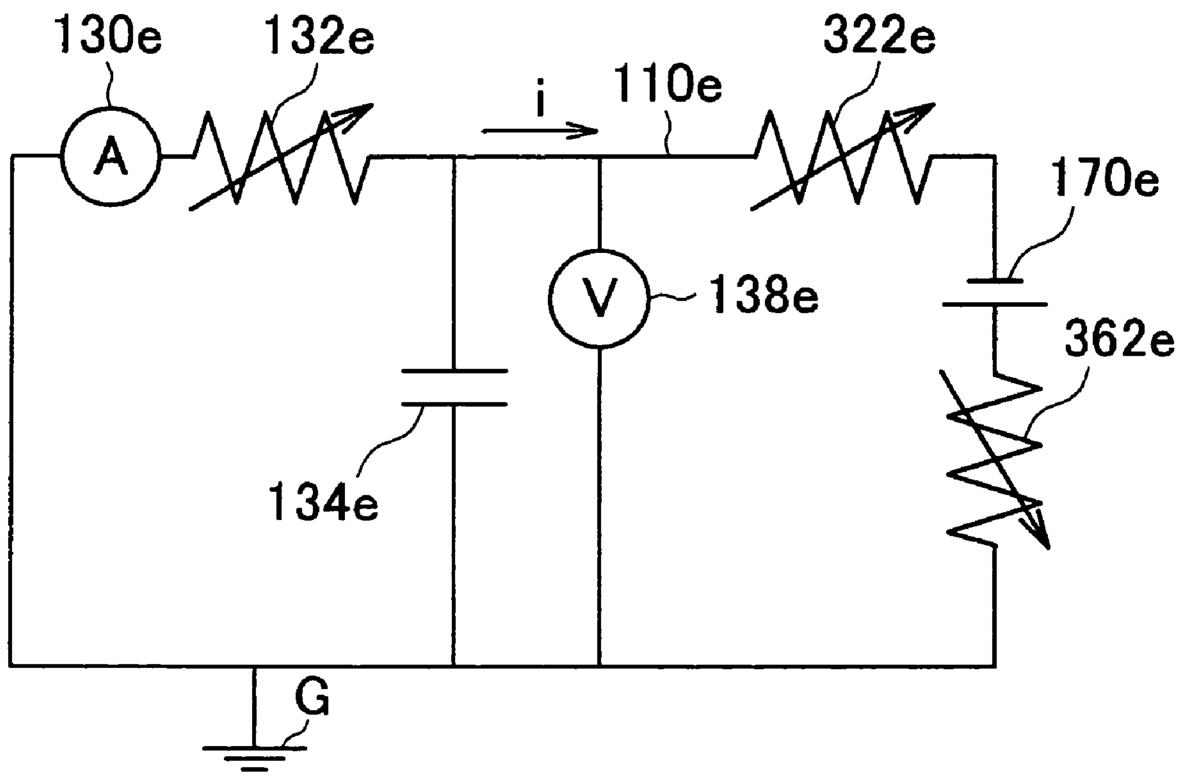

FIGS. 4A and 4B show how the operation angle is aerodynamically estimated. FIG. 4A shows the intake/exhaust mechanism 150 as an essential portion of the gasoline engine 100 shown in FIG. 1. FIG. 4B represents the linear model of the intake/exhaust mechanism 150 in the form of an electric circuit. The stable state of both the load and the engine speed Ne of the gasoline engine is linearly approximated to this linear model. In the linear model, the flow of air is replaced by the electric current. Accordingly the potential difference of resistance corresponds to the pressure loss.

Each element of the intake/exhaust mechanism 150 corresponds to the element of the linear model shown in FIG. 4B as follows. The outside air corresponds to the ground G, the air flow meter 130 corresponds to an ampere meter 130*e*, the intake pipe 110 that admits intake air corresponds to a conductor 110*e*, and the throttle valve 132 that adjusts the intake air amount corresponds to a variable resistance 132*e*. The surge tank 134 that suppresses the fluctuation in the intake air pressure corresponds to a capacitor 134*e*, the intake air pressure sensor 138 that measures the intake air pressure corresponds to a voltmeter 138*e*, the intake valve 322 that adjusts the intake air supplied to the combustion chamber corresponds to the variable resistance 322*e*, the exhaust valve 362 that adjusts the exhaust gas discharged from the combustion chamber corresponds to the variable resistance 362*e*, and the cylinder 170 and the piston 171 each functioning aerodynamically as the pump correspond to a battery 170*e*.

When the load and the engine speed Ne of the gasoline engine 100 are in the stable state, the voltage of the battery 170*e* as the corresponding element is also in the stable state. Assuming that the current flowing through the series circuit formed of the variable resistance 322*e*, battery 170*e*, the variable resistance 362*e*, and the potential difference in the series circuit are measured, the resistance value of the series circuit may be calculated. The current can be measured by the ampere meter 130*e*, and the voltage can be measured by the voltmeter 138*e*.

If the voltage of the battery 170*e* is further determined, the aforementioned two values of the variable resistances 322*e*, 362*e* can be calculated. Meanwhile the amount corresponding to the voltage of the battery 170*e* can also be determined in accordance with the engine speed Ne. It is clarified that the calculation can be performed even if the resistance value of the variable resistance 132*e* corresponding to the throttle valve 132 cannot be determined.

When the load and the engine speed Ne of the gasoline engine 100 are in the stable state, each operation angle θ of the valves 322, 362 corresponding to the variable resistance values 322*e*, 362*e* can be estimated based on the intake air pressure Ps and the intake air flow rate Ms.

The valve train state estimation section 15 calculates the difference between the estimated operation angles θea and θeδ as the error in the operation angle θ owing to aging. The error in the operation angle θ is further converted into the operation amount of the actuator sensor 250 so as to calculate the correction amount Ea.

Figure 5:
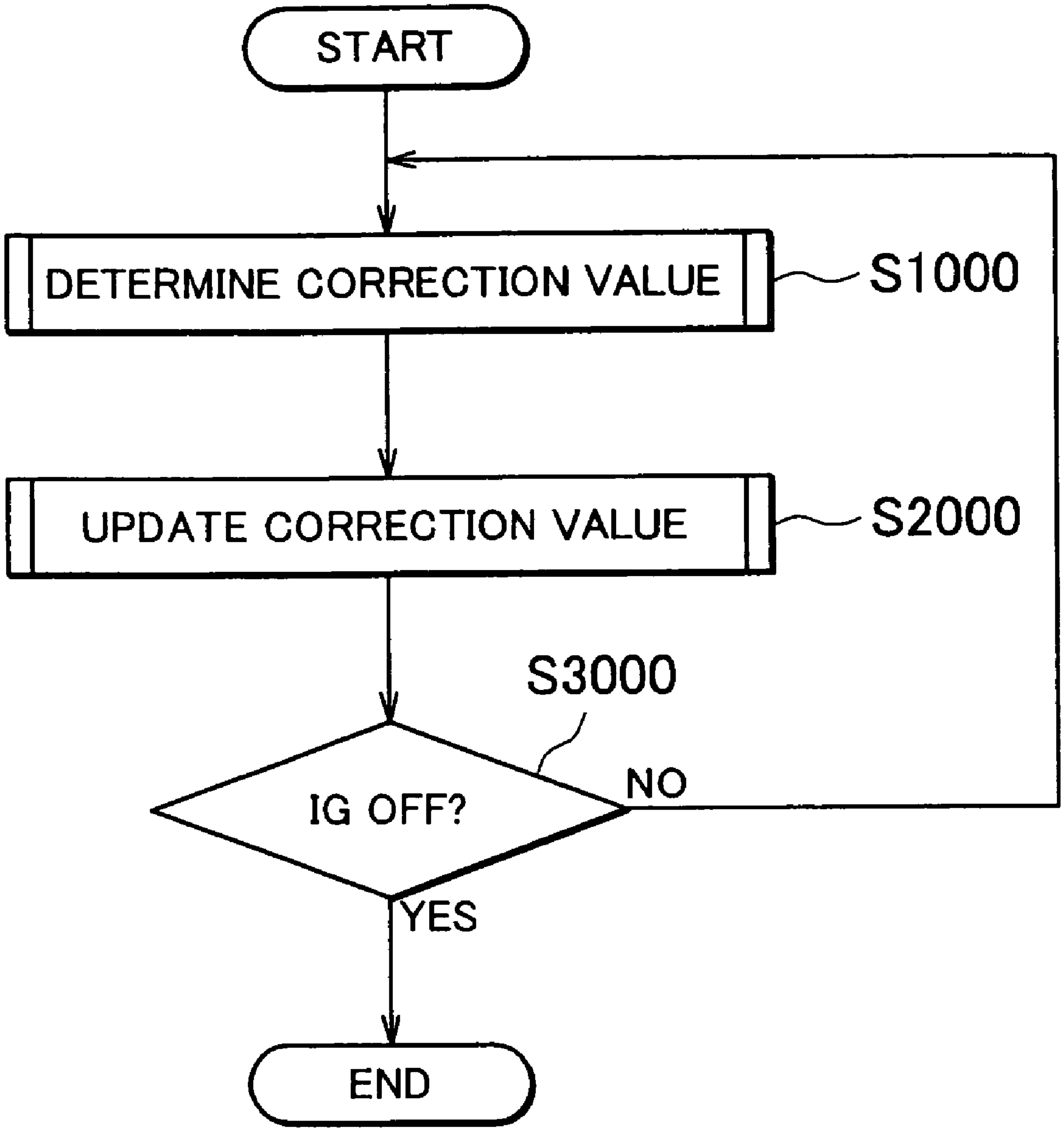
FIG. 5 is a flowchart representing a control routine of correction in the first embodiment.

FIG. 5 is a flowchart showing a control routine of correction executed in the first embodiment according to the invention. In the control routine for the correction, the characteristic change in the subject to be controlled owing to aging is compensated by correcting the operation angle of the valve. In step S1000, the valve train state estimation section 15 (see FIG. 3) of the ECU 10 determines the correction amount Ea as the correction value. In step S2000, the operation angle command section 14 updates the correction value at a timing so as not to exert an excessive influence to the drivability. The aforementioned process is continuously executed until the ignition is set to OFF state in step S3000.

Figure 6:
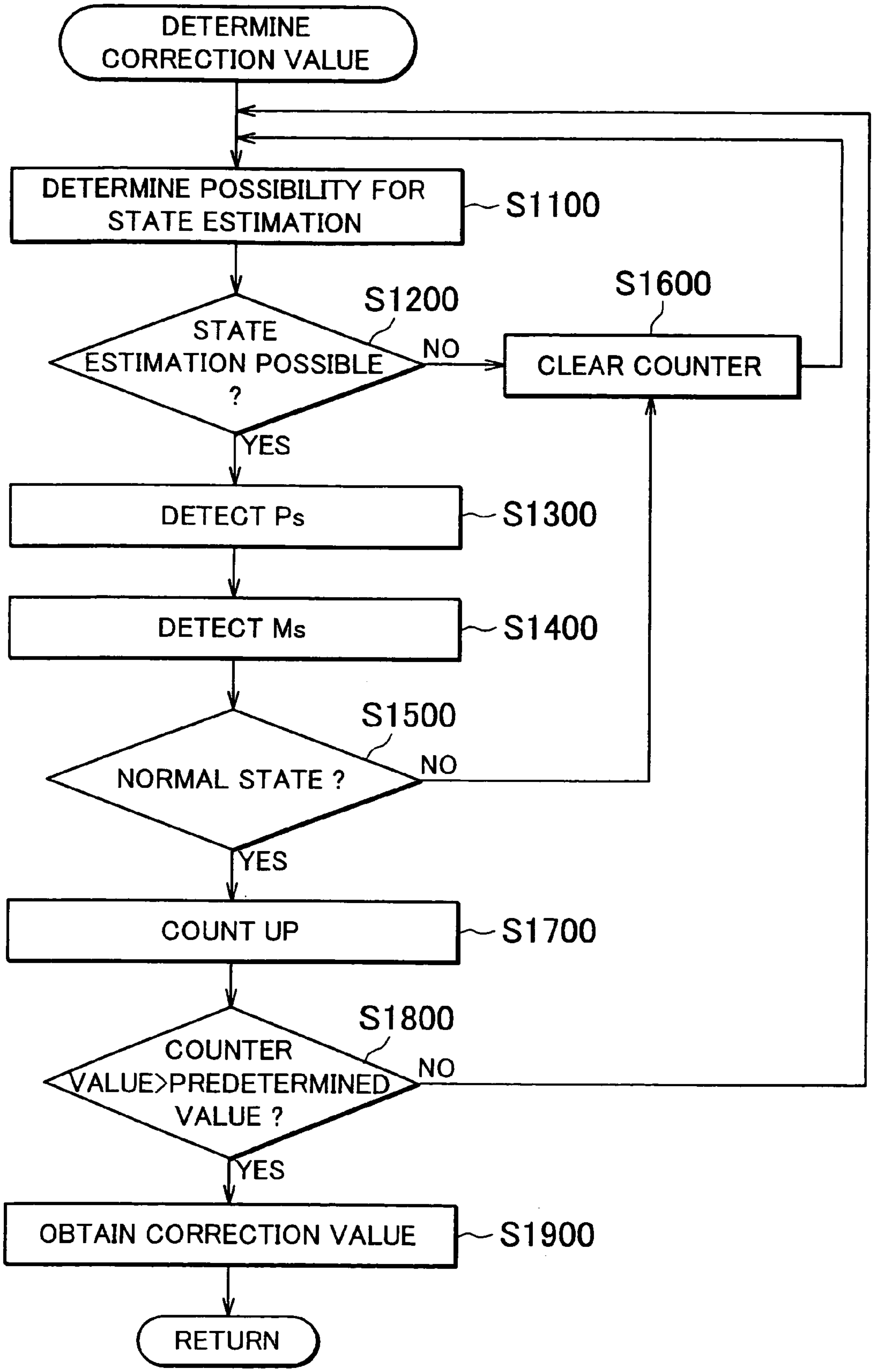
FIG. 6 is a flowchart representing a control routine of determining a correction value in the first embodiment.

FIG. 6 is a flowchart showing a control routine of the process for determining a correction value in the first embodiment according to the invention. In step S1100, it is determined whether it is possible to perform the state estimation, that is, it is possible to aerodynamically estimate the operation angle.

In this embodiment, it is determined that the estimation can be performed when the following conditions are established.

(1) Each measurement value of the intake air pressure sensor 138 and the air flow meter 130 is in a reliable state, for example, where those measurement values of the intake air pressure sensor 138 and the air flow meter 130 are in the convergent state and measure the value other than an excessively large or small one.

(2) Purging control or EGR control is not executed in the intake/exhaust mechanism 150. The purging control is executed by releasing the fuel vaporized within the fuel tank (not shown) into the surge tank 134 so as not to increase the pressure within the fuel tank to an excessively large value. The EGR control is executed by mixing the exhaust gas partially with the intake air so as to be recirculated. The purging control or the EGR control executed during the estimation may change the aerodynamic behavior within the intake/exhaust mechanism 150. As a result, the reliability of the measurement values of the intake air flow rate measured by the air flow meter 130 may be deteriorated. That is why the estimation is performed when the purging control or the EGR control is not executed.

(3) Learning (calibration) of the reference positions of both the intake valve 322 and the exhaust valve 362 are completed. The learning is realized by mechanically making the actuator 220 for the valve train adjustment mechanism bottomed.

If it is determined that it is not possible to perform the state estimation in step S1200, the process proceeds to step S1600 where the counter is cleared. The process then returns to step S1100 where it is determined whether it is possible to perform the state estimation. Meanwhile if it is determined that it is possible to perform the state estimation in step S1200, the process proceeds to step S1300.

In step S1300, the ECU 10 stores the measurement value of the intake air pressure Ps obtained from the intake air pressure sensor 138 in the RAM (not shown). Then in step S1400, the ECU 10 stores the measurement value of the intake air flow rate Ms obtained from the air flow meter 130 to another address in the RAM.

In step S1500, it is determined whether the gasoline engine 100 is operated in a normal state, that is, the engine speed Ne and the load (torque) are held substantially constant. More specifically, when each of the measurement values such as the engine speed Ne is within a range between +5% and −5% of the respective average value, it may be determined that the engine 100 is operated in the normal state. In order to improve the estimation accuracy, it may be determined whether not only the engine speed Ne and the load of the engine but also the intake air pressure Ps and the intake air flow rate Ms are held substantially constant.

If it is determined that the engine 100 is not in the normal state in step S1500, the process proceeds to step S1600 where the counter is cleared. The process then returns to step S1100. Meanwhile if it is determined that the engine 100 is operated in the normal state in step S1500, the process proceeds to step S1700 where the counter value is incremented. The process then proceeds to step S1800.

In step S1800, it is determined whether the counter value is larger than a predetermined value. The determination is made as to whether the normal state is continued for the time interval required for determining the correction value (3 seconds, for example). If the counter value is equal to or smaller than the predetermined value, the process returns to step S1100 without clearing the counter value. If the counter value exceeds the predetermined value, the process proceeds to step S1900.

In step S1900, the valve train state estimation section 15 (see FIG. 3) calculates the correction amount Ea as the correction value in the manner as described above. The newly calculated correction value Ea is transmitted to the operation angle command section 14 so as to store the received correction amount Ea in the RAM.

Figure 7:
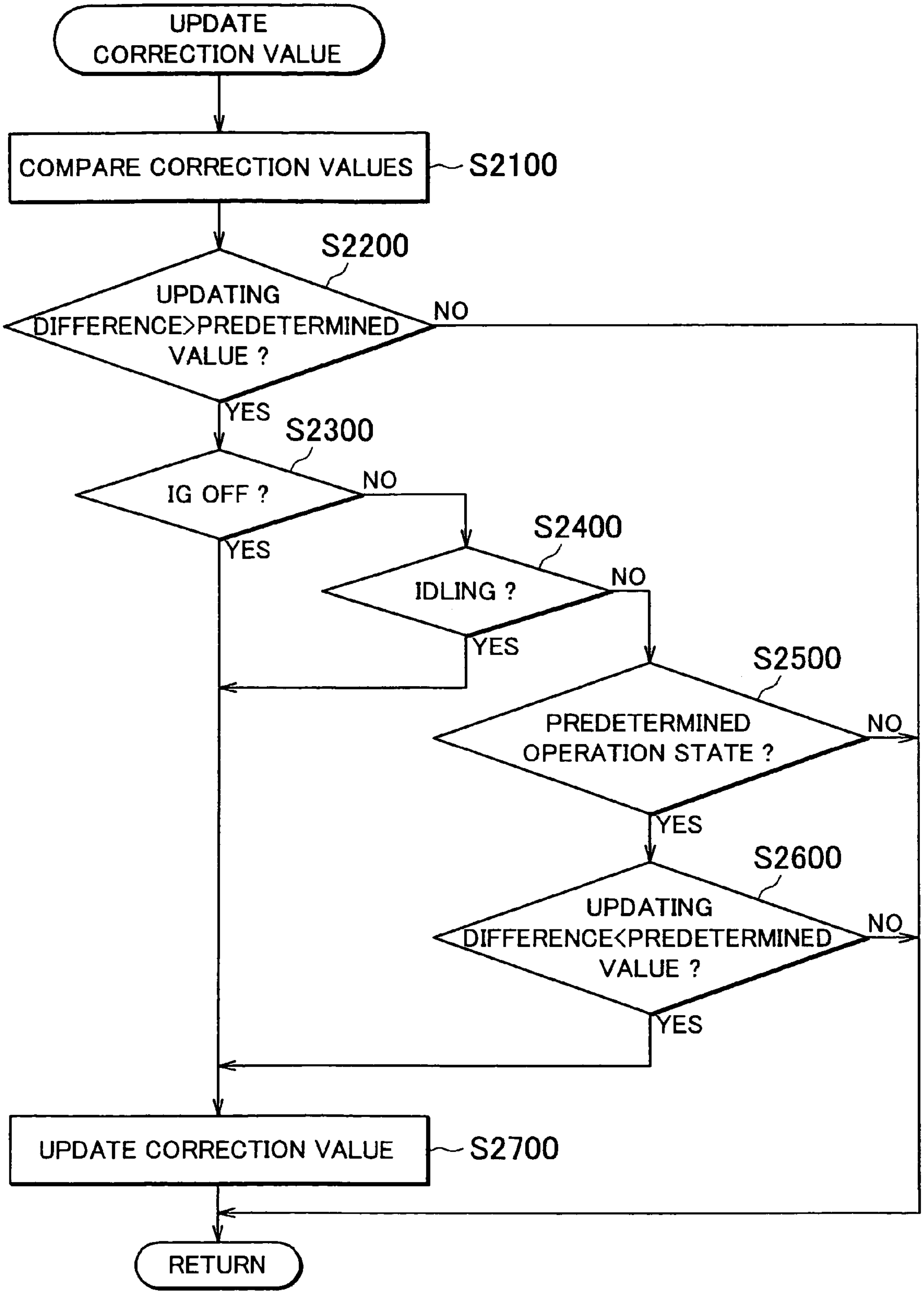
FIG. 7 is a flowchart representing a control routine of executing the correction in the first embodiment.

FIG. 7 is a flowchart of the control routine for the process of correction executed in the first embodiment. The process for updating the correction value is executed to update the correction amount Ea at a timing so as not to give an excessive influence on the drivability. The aforementioned process is necessary to prevent an emergent fluctuation in the torque owing to updating of the correction value.

In step S2100, the operation angle command section 14 calculates the updating difference as the difference between the calculated correction amount Ea and the correction amount that has been currently used. When the correction is not performed, the correction amount that has been currently used is regarded as being zero.

In step S2200, it is determined whether the updating difference is larger than a predetermined value. If the updating difference is equal to or smaller than the predetermined value, the operation angle command section 14 determines that the correction is not necessary. The process then returns to the process for determining the correction value (see FIG. 6, and step S3000 in FIG. 5). If the updating difference is larger than the predetermined value, the process proceeds to step S2300.

In step S2300, it is determined whether the ignition is in OFF state. If the ignition is in OFF state, updating of the correction value is allowed without affecting the drivability. If it is determined that the ignition is in OFF state in step S2300, the process proceeds to step S2700 where the correction value is updated. In this way, the correction amount Ea that is output together with the nominal lift amount δc from the operation angle command section 14 is updated in the state where the ignition is held OFF such that the drivability is not affected. If it is determined that the ignition is in ON state in step S2300, the process proceeds to step S2400.

In step S2400, it is determined whether the gasoline engine 100 is in an idling state. If the engine 100 is in the idling state, the correction value can be updated without affecting the drivability even if the ignition is in ON state. The determination with respect to the idling state of the engine may be performed in accordance with the input signal from, for example, the accelerator sensor 109. If it is determined that the engine 100 is in the idling state in S2400, the process proceeds to step S2700 where the correction value is updated. If it is determined that the engine 100 is not in the idling state in S2400, the process proceeds to step S2500. The fuel cut state where the fuel is not supplied to the internal combustion engine may be regarded as the state similar to the idling state.

In step S2500, it is determined whether the gasoline engine 100 is in a predetermined operation state, that is, whether each of the operation angles of the valves 322, 362 is larger than a predetermined angle. When the engine is in the operation state where the operation angle is relatively large, the degree of change in the operation angle may be relatively smaller depending on the correction value even if the correction value is updated. This makes it possible to update the correction value without excessively affecting the drivability.

The determination as to whether the gasoline engine 100 is in the predetermined operation state may be made in accordance with the nominal lift amount δc (containing no correction amount) output from the operation angle command section 14. If the engine 100 is in the predetermined operation state, the process proceeds to step S2600 where it is determined whether the correction value is smaller than a predetermined value. If the correction value is smaller than the predetermined value, the process proceeds to step S2700 where the correction value is updated. If the engine 100 is not in the predetermined operation state, or the correction value is equal to or larger than the predetermined value, the process then returns to the process for determining the correction value (FIG. 6, and step S3000 in FIG. 5). The predetermined value is preliminarily set as the value that allows updating of the correction value without excessively affecting the drivability in the predetermined operation state.

The control system according to the first embodiment compensates the mechanical characteristic change such as reduction in the valve lift amount owing to aging of the variable valve train mechanism 320 by correcting the operation angle of the valve. As a result, the error in the amount of air admitted into the combustion chamber is reduced. This makes it possible to suppress deterioration in the air fuel ratio control owing to aging or piece-to-piece variation among the internal combustion engines.

The operation angle of the valve is corrected at a timing so as not to excessively affect the drivability. This makes it possible to suppress the influence exerted to the drivability resulting from correcting the operation angle.

C. Valve Train Mechanism Control System in Second Embodiment

Figure 8:
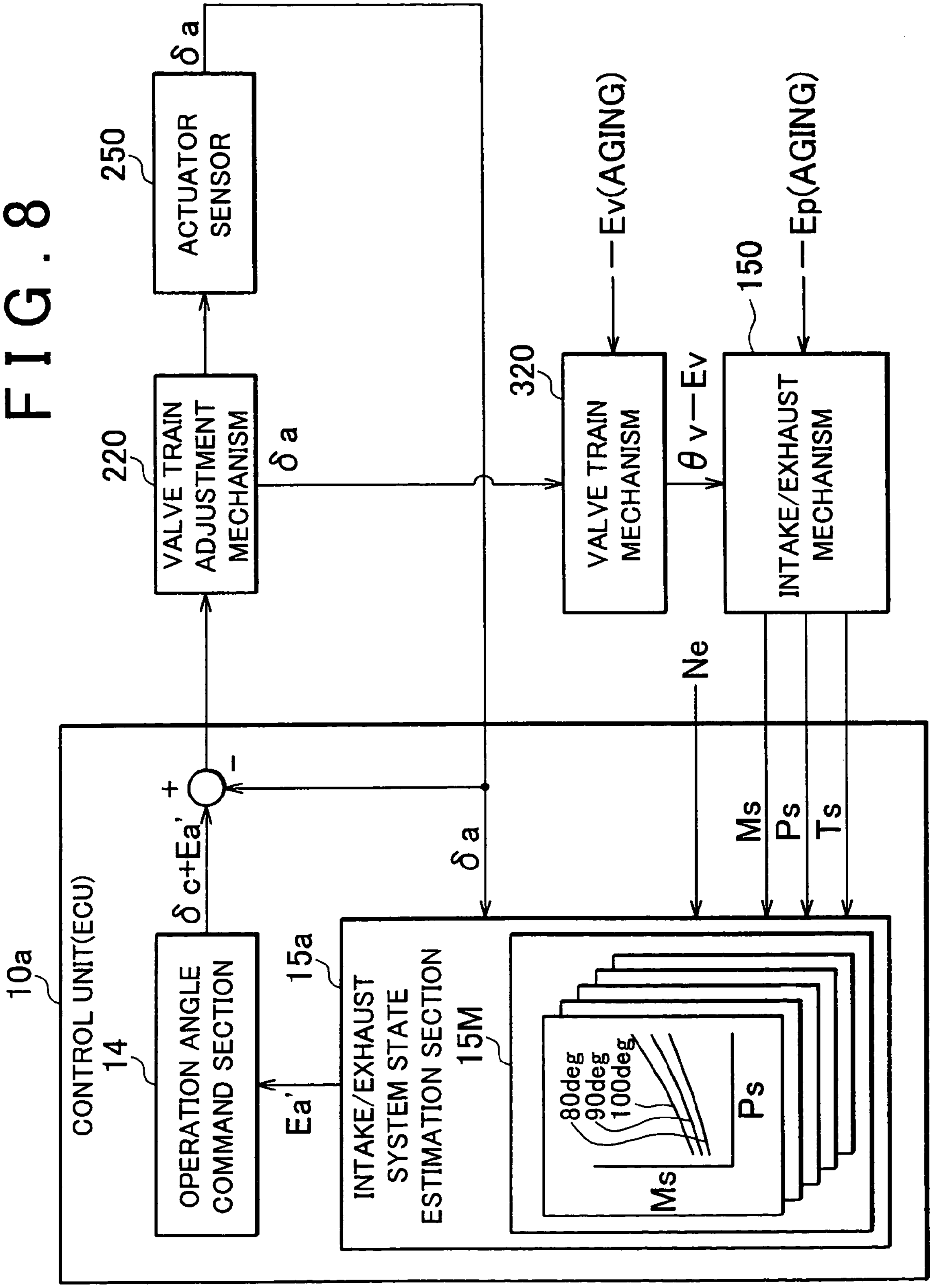
FIG. 8 is a block diagram of the variable valve train system in a second embodiment.

FIG. 8 is a block diagram of the valve train mechanism control system according to a second embodiment of the invention. The valve train control system of this embodiment is different from that of the first embodiment in that the structure for compensating not only the reduction in the valve lift amount Ev of the valve owing to aging of the variable valve train mechanism 320 (see FIGS. 3, 8) but also the increase in the air resistance (increase in the pressure loss) owing to aging of the intake/exhaust system 150.

The increase in the air resistance owing to aging of the intake/exhaust mechanism 150 is expressed as the reduced valve lift amount Ep (see FIG. 8). This is because the increase in the air resistance of the intake/exhaust pipe can be considered as being qualitatively equivalent to the reduced valve lift amount.

This embodiment is effective especially when it is preliminarily obvious that not only reduction in the valve lift amount of the variable valve mechanism 320 but also increase in the air resistance due to sediment on the intake valve 110 or the exhaust valve 120 of the intake/exhaust mechanism 150 are regarded as an important factor of the change in the subject to be controlled owing to aging.

The valve train control system of the second embodiment is different from that of the first embodiment in the use of the ECU 10*a* in place of the ECU 10. The ECU 10*a* is provided with an intake/exhaust system state estimation section 15*a* in place of the intake/exhaust system state estimation section 15. The intake/exhaust system state estimation section 15 is structured on the assumption that the substantial reduction in the valve lift amount is constant irrespective of the engine operation state. Meanwhile, the intake/exhaust system state estimation section 15*a* of the second embodiment is structured on the assumption that the substantial reduction in the valve lift amount (Ev+Ep) is likely to change depending on the engine operation state.

The increase in the air resistance owing to aging of the intake/exhaust mechanism 150 is considered as being qualitatively equivalent to the reduced amount Ep of the valve lift amount. Accordingly, the same map as the valve train state estimation map 15M for the first embodiment may be used in the second embodiment for calculating the correction amount in the same manner as in the first embodiment.

FIG. 9 is an explanatory view that shows the correction amount Ea' calculated in the second embodiment of the invention. Unlike the first embodiment where a single correction amount Ea is calculated, the correction amount Ea' is calculated under the respective conditions (combination of the engine speed Ne and the operation angle θ) in the second embodiment. In this embodiment, the engine speed Ne corresponds to the engine speed of the internal combustion engine, and the operation angle θ corresponds to the adjustment position of the valve adjustment mechanism.

Referring to FIG. 9, in the range of the engine speed Ne between 801 and 1600 rpms, the correction amount Ea' is calculated as one combination at the operation angle between 111 and 120 degs. In the range of the engine speed Ne between 1601 and 2400 rpms, the correction amount Ea' is calculated as two combinations at the operation angle between 101 and 110 degs., and between 121 and 130 degs., respectively. The aforementioned three values of the correction amount Ea' are different with one another.

The correction amount Ea' is set to the different value depending on the engine operation state in consideration with the increase in the air resistance owing to sediments on the intake pipe 110 or the exhaust pipe 120, which tends to vary with the engine operation state. The sediments on the wall surface of the intake and exhaust pipes 110, 120 may cause turbulence thereon. The turbulence may further cause nonlinear fluctuation in the air resistance value depending on the intake air amount.

The control system of the second embodiment provides an advantageous effect that compensates not only the reduced valve lift amount owing to aging of the variable valve mechanism 320 but also the change in the aerodynamic characteristics including the increase in the air resistance (pressure loss) owing to aging of the intake/exhaust mechanism 150 by correcting the operation angle of the valve.

This embodiment may be applied not only to the subject that employs the mechanism having the operation angle (valve opening interval) θ adjusted by changing the valve lift amount but also to the subject that employs the mechanism that allows the operation angle θ to be changed independent from changing of the valve lift amount. In this embodiment, the correction amount Ea' is calculated in accordance with the engine operation state on the assumption in contradiction to that of the first embodiment that the substantial reduced valve lift amount is constant irrespective of the engine operation state.

D. Valve Train Control System in the Third Embodiment

Figures 10A, 10B:
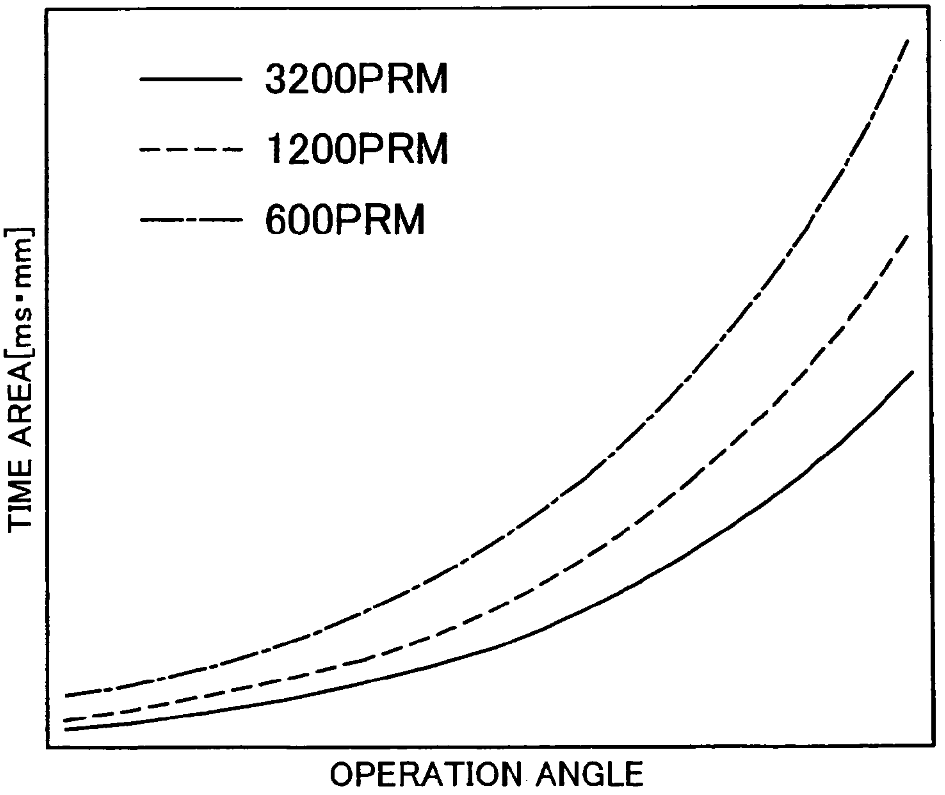
FIGS. 10A and 10B are explanatory views showing each value of correction amount Ea" calculated in a third embodiment.

FIGS. 10A and 10B are explanatory views representative of a correction amount Ea" in a third embodiment of the invention. FIG. 10A shows each value of the correction amounts Ea" calculated at every valve-opening time area. FIG. 10B shows an example of the map representing the relationship between the valve-opening time area and the engine speed Ne.

The third embodiment is similar to the second embodiment in that a plurality of values of the correction amount Ea" are calculated as shown in FIG. 10A. In the third embodiment, the valve-opening area is used as the operating condition, which is different from that of the second embodiment where the combination of the engine speed Ne and the operation angle is used. The valve-opening time area is expressed as the value obtained by integrating the valve lift amount with time. It is calculated based on the engine speed Ne and the operation angle in reference to the map.

Figure 11A:
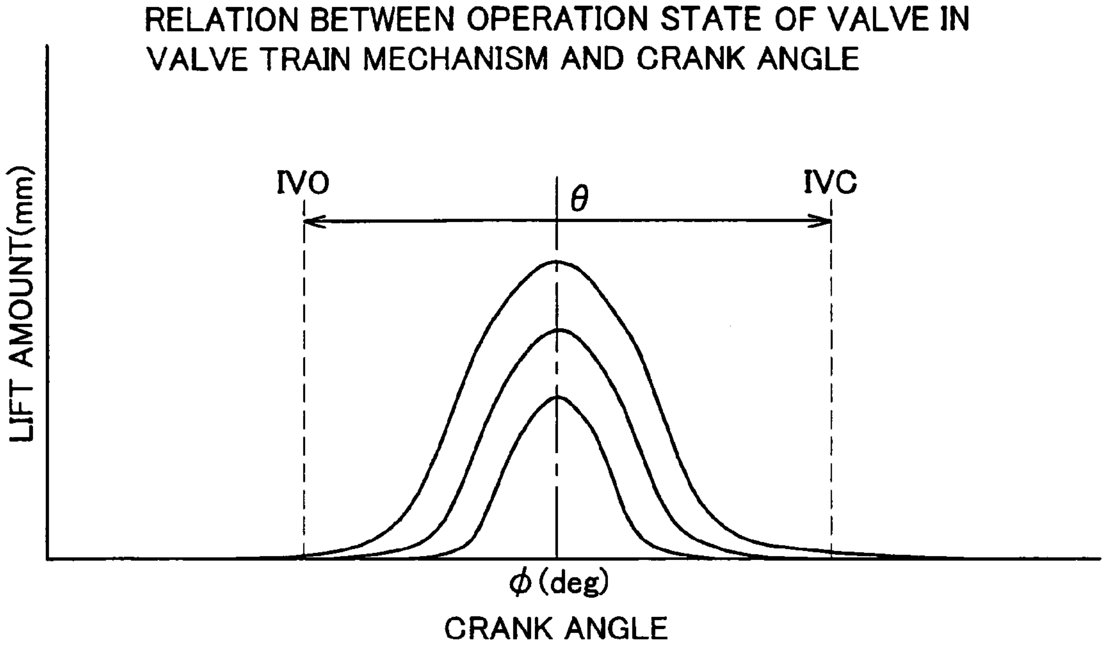
FIGS. 11A and 11B are conceptual views each representing an area in the valve-opening time in the third embodiment.
Figure 11B:
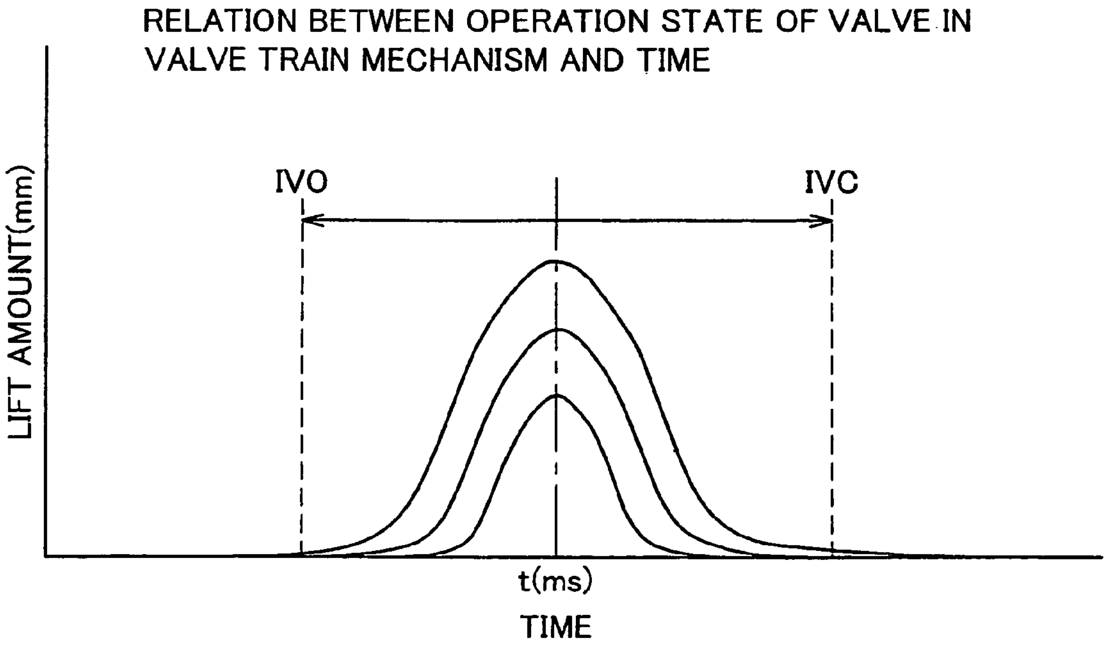

FIGS. 11A and 11B are explanatory views representative of the valve-opening time area used in the third embodiment of the invention. FIG. 11A shows the relationship between the valve lift amount of the intake valve 322 in the variable valve mechanism 320 and the crank angle ϕ. FIG. 11B shows the relationship between the valve lift amount of the intake valve 322 and the time t. The time t as the x-axis of the graph of FIG. 11B is obtained by converting the crank angle ϕ as the x-axis of the graph of FIG. 11A using the engine speed Ne. The valve-opening time area corresponds to the area defined by the x-axis and the curb representing the valve lift amount in FIG. 11B.

In the mechanism where the operation angle θ is adjusted by changing the valve lift amount, the dynamic characteristics of the intake air become uniform irrespective of the engine speed Ne or the operation angle θ. This is well known to those skilled in the art experientially. In other words, even if the engine speed Ne or the operation angle θ is changed, the dynamic characteristics of the intake air are substantially uniform so long as the valve-opening time area is kept uniform. This makes it possible to perform the same correction. The aforementioned mechanism employs the valve-opening time area as the operating condition instead of the combination of the engine speed Ne and the operation angle θ.

The third embodiment employs a single parameter, that is, the valve-opening time area instead of two parameters, that is, the engine speed Ne and the operation angle so as to obtain the correction value Ea" at every operating condition. This makes it possible to simplify the time-consuming calculation of the correction value.

E. Fuel Supply Control System in Fourth Embodiment

Figure 12:
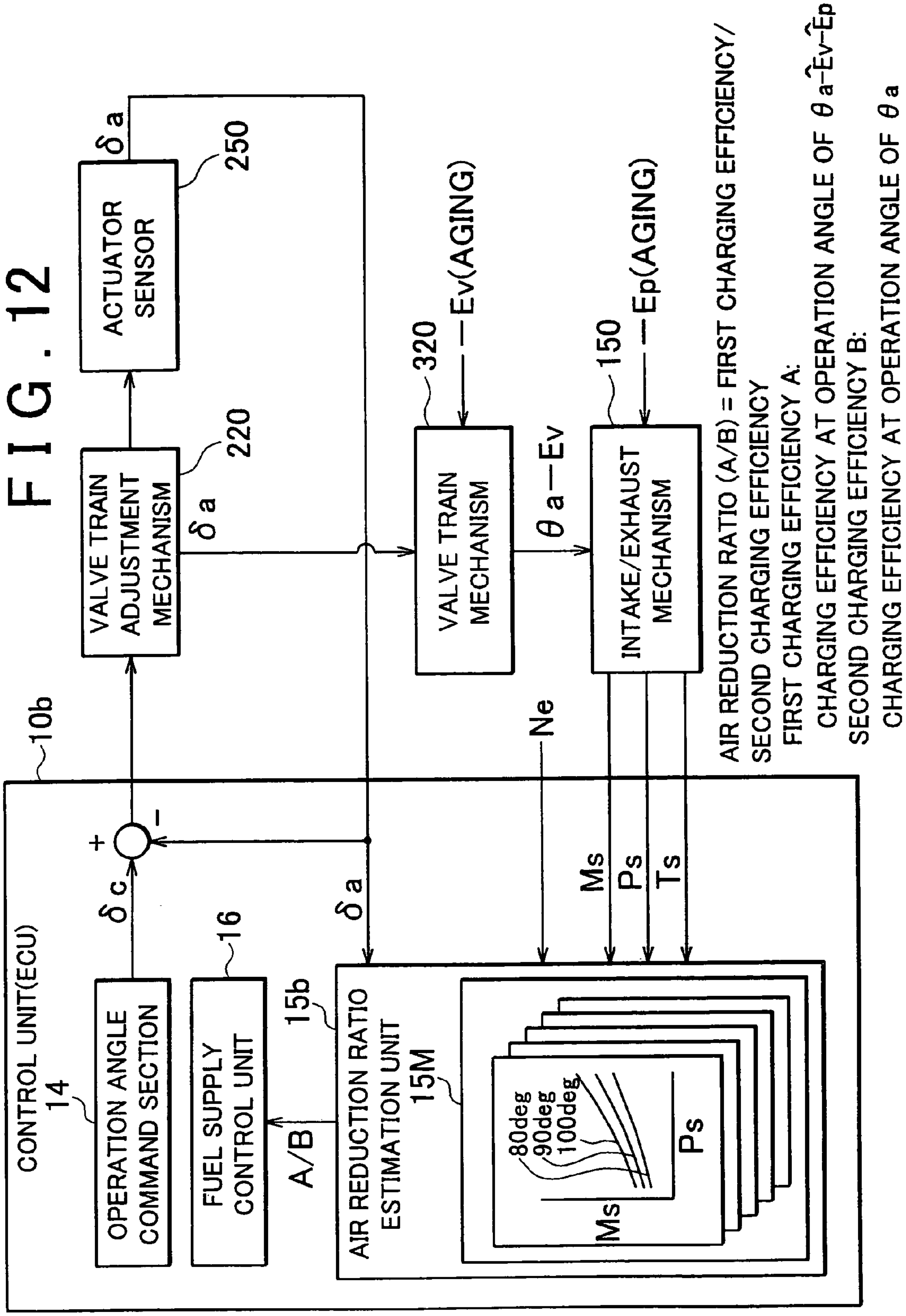
FIG. 12 is a block diagram of a fuel supply control system according to a fourth embodiment.

FIG. 12 is a block diagram of a fuel supply control system in a fourth embodiment of the invention. The fuel supply control system of this embodiment for compensating the characteristic change of the subject to be controlled owing to aging by correcting the fuel supply quantity is different from the first to the third embodiments for compensating the characteristic change by correcting the operation angle of the valve. The correction of the fuel supply quantity is performed on the basis of the concept of an in-cylinder air charging ratio. The "in-cylinder air charging ratio" represents the ratio of the amount of air admitted into the combustion chamber in a single combustion cycle to the displacement of the combustion chamber.

The fuel supply control system in the fourth embodiment employs an air reduction ratio estimation section 15*b* in place of the valve train mechanism estimation section 15 (see FIG. 3) or the intake/exhaust state estimation section 15*a* (see FIG. 8). The air reduction ratio estimation section 15*b* calculates the air reduction ratio (A/B) so as to be transmitted to the fuel supply control section 16.

The air reduction ratio (A/B) is obtained by dividing the first charging efficiency A by the second charging efficiency B. The first charging efficiency represents the in-cylinder air charging ratio of the combustion chamber in the gasoline engine 100 after the fluctuation owing to aging. The second charging efficiency represents the in-cylinder air charging ratio of the combustion chamber in the gasoline engine 100 before the fluctuation owing to aging.

The air reduction ratio (A/B) is calculated by the air reduction ratio estimation section 15*b* in the following manner.

(1) The substantial reduction in the valve lift amount is estimated. Based on the estimated valve lift amount and the measurement value of the air flow meter 130, the first charging efficiency A (charging efficiency after aging) is calculated. The substantial reduction in the valve lift amount is derived from the intake air pressure Ps, the intake air flow rate Ms, the intake air temperature Ts input from the intake/exhaust mechanism 150, the mechanical operation amount δa input from the actuator sensor 250, and the engine speed Ne in the same manner as in the first to the fourth embodiments.

(2) The second charging efficiency B (charging efficiency before aging) is calculated in accordance with the measurement value of the air flow meter 130 on the assumption that there is substantially no reduction in the valve lift amount.

(3) The air reduction ratio (A/B) is calculated by dividing the first charging efficiency by the second charging efficiency.

The calculated air reduction ratio (A/B) is transmitted from the air reduction ratio estimation section 15*b* to the fuel supply control section 16 such that the fuel supply quantity is corrected in accordance with the air reduction ratio (A/B). This makes it possible to bring the air/fuel ratio into an optimum value.

It is clear that the invention may be applied to the structure that compensates the characteristic change in the subject to be controlled owing to aging not only by correcting the operation angle of the valve but also by correcting the fuel supply quantity.

This embodiment estimates the substantial value of reduction in the valve lift amount as well as calculates the first charging efficiency in accordance with the estimated reduction amount. However, it may be structured to directly calculate the first charging efficiency in response to the input from the intake/exhaust mechanism 150 or the actuator sensor 250. The aforementioned calculation may be performed by preparing the map that directly represents the relationship between the input value from the intake/exhaust mechanism 150 or the actuator sensor 250 and the first charging efficiency.

The internal combustion engine in the fourth embodiment is provided with the variable valve mechanisms 320, 360. However, the invention is applicable to the internal combustion engine that is not provided with the variable valve mechanisms 320, 360. It is to be noted that the invention provides a remarkable effect especially when the internal combustion engine provided with the variable valve mechanisms 320, 360 is employed because the characteristic change in the aforementioned type of the internal combustion engine owing to aging tends to become larger. The aforementioned internal combustion engine is intended to be operated with relatively small valve lift amount. In the aforementioned operation, the sediments on the valve or the intake port of the combustion chamber is likely to give a substantial influence on the in-cylinder charged air amount.

F. Modified Example

The invention is not limited to the embodiments as aforementioned but embodied in various forms without departing from spirit and scope of the invention. For example, the invention may be modified as described below.

F-1. In the valve adjustment mechanism of the respective embodiments, the valve lift amount and the operation angle are changed at the same timing. It may be structured to have one of the valve lift amount and the operation angle adjustable. Generally the valve adjustment mechanism employed in the invention may be structured to have at least one of the valve lift amount and the operation angle adjustable.

F-2. The respective embodiments are structured to compensate the characteristic change owing to aging after production of the intake/exhaust mechanism of the internal combustion engine. It is possible to be structured to compensate the characteristic change owing to variation in the individual products immediately after the production or overhauling. It is possible to be structured to estimate the characteristic change not only in the intake/exhaust mechanism but also in the internal combustion engine as a whole. The characteristic change in the internal combustion engine corresponds to the difference of the state between the group of internal combustion engines on the assumption that there is no piece-to-piece variation based on an ideal concept and the actual internal combustion engine to be controlled.

F-3. The invention is not limited to the engine provided with the intake/exhaust variable valve timing mechanism but is applicable to the engine having either the intake side or the exhaust side only provided with the variable valve timing mechanism, or the engine with no variable valve timing mechanism. The engine with the variable valve timing mechanism may be operated at a relatively smaller operation angle, and likely to be influenced by aging. Therefore, the invention becomes effective especially for the aforementioned type of the engine.

The invention is applied not only to the intake port injection engine, but also to the in-cylinder injection engine. The air flow meter (intake air flow rate detecting unit) is not limited to the heat type air flow meter. The air flow meter of vane type or Karman vortex type, for example may be employed.

What is claimed is:

1. A control apparatus that controls an internal combustion engine including a fuel supply mechanism capable of adjusting a fuel supply amount, the control apparatus comprising:

a characteristic change estimation unit that estimates a characteristic change in the internal combustion engine in accordance with a predetermined condition; and a fuel supply mechanism control unit that controls the fuel supply mechanism, wherein the fuel supply mechanism control unit controls the fuel supply mechanism such that the characteristic change in the internal combustion engine is compensated in accordance with an estimation performed by the characteristic change estimation unit, wherein the characteristic change is a state change.

2. The control apparatus according to claim 1, wherein the internal combustion engine includes a valve adjustment mechanism that is capable of adjusting at least one of a lift amount and an operation angle of a valve, and the control apparatus further comprises a valve adjustment mechanism control unit that controls the valve adjustment mechanism.

3. The control apparatus according to claim 2, wherein the characteristic change estimation unit estimates a mechanical characteristic change in the valve adjustment mechanism including a change in an amount of at least one of the lift amount and the operation angle of the valve.

4. The control apparatus according to claim 2, wherein the valve adjustment mechanism control unit is capable of executing a calibration operation so as to confirm a reference position of the valve adjustment mechanism, and wherein the characteristic change estimation unit performs the estimation after completion of the calibration operation.

5. The control apparatus according to claim 2, wherein the characteristic change estimation unit performs the estimation in accordance with a combination of an engine speed of the internal combustion engine and an adjustment position of the valve adjustment mechanism.

6. The control apparatus according to claim 2, wherein the characteristic change estimation unit performs the estimation at every valve opening time area obtained by integrating the lift amount of the valve with time.

7. The control apparatus according to claim 1, wherein the characteristic change estimation unit estimates a change in an intake air characteristic of the internal combustion engine.

8. The control apparatus according to claim 4, wherein the change in the intake air characteristic comprises an aerodynamic characteristic change including a change in a pressure loss on a path where air is admitted into the combustion chamber of the internal combustion engine.

9. The control apparatus according to claim 1, wherein the characteristic change estimation unit performs an estimation when the internal combustion engine is in a predetermined normal operation state where a load and an engine speed of the internal combustion engine are held within a predetermined range for a predetermined time period.

10. The control apparatus according to claim 1, wherein the internal combustion engine is capable of executing a purging control under which the fuel vaporized within a fuel tank is released into the intake air, and wherein the characteristic change estimation unit performs the estimation when the purging control is not executed.

11. The control apparatus according to claim 1, wherein the internal combustion engine is capable of executing an EGR control under which exhaust gas is partially mixed with the intake air so as to be re-circulated, and wherein the characteristic change estimation unit performs the estimation when the EGR control is not executed.

12. An internal combustion engine comprising:

a fuel supply mechanism capable of adjusting a fuel supply amount;

a characteristic change estimation unit that estimates a characteristic change in the internal combustion engine in accordance with a predetermined condition, the intake air flow rate detected by the flow rate sensor and the intake air pressure detected by the pressure sensor, and a fuel supply mechanism control unit that controls the fuel supply mechanism, wherein the fuel supply mechanism control unit controls the fuel supply mechanism such that the characteristic change in the internal combustion engine is compensated in accordance with an estimation performed by the characteristic change estimation unit.

13. A control method that controls an internal combustion engine including a fuel supply mechanism capable of adjusting a fuel supply amount, the control method comprising the steps of:

estimating a characteristic change in the internal combustion engine in accordance with a predetermined condition, the intake air flow rate and the intake air pressure; and controlling the fuel supply mechanism such that the characteristic change in the internal combustion engine is compensated in accordance with the estimation.

14. A control apparatus according to claim 1, further comprising one of a flow rate sensor that detects an intake air flow rate that represents a flow rate of air admitted into a combustion chamber of the internal combustion engine and a pressure sensor that detects an intake air pressure that represents a pressure of the air admitted into the combustion chamber of the internal combustion engine, wherein the characteristic change estimation unit estimates the characteristic change in the internal combustion engine in accordance with one of the intake air flow rate detected by the flow rate sensor and the intake air pressure detected by the pressure sensor.

15. The control apparatus according to claim 1, further comprising:

a flow rate sensor that detects an intake air flow rate that represents a flow rate of air admitted into a combustion chamber of the internal combustion engine; and a pressure sensor that detects an intake air pressure that represents a pressure of the air admitted into the combustion chamber of the internal combustion engine, wherein the characteristic change estimation unit estimates the characteristic change in the internal combustion engine in accordance with the intake air flow rate detected by the flow rate sensor and the intake air pressure detected by the pressure sensor.

* * * * *